April 20, 1965     J. W. JONES     3,179,724
METHOD OF FIRING CERAMIC ARTICLES
Filed June 7, 1963

INVENTOR
JOHN W. JONES
BY *Hugh E. Smith*
ATTORNEY

United States Patent Office 3,179,724
Patented Apr. 20, 1965

3,179,724
METHOD OF FIRING CERAMIC ARTICLES
John W. Jones, Olean, N.Y., assignor to Olean Tile Company, Olean, N.Y., a corporation of New York
Filed June 7, 1963, Ser. No. 286,404
2 Claims. (Cl. 264—58)

The present invention relates in general to the manufacture of ceramic products and more particularly to an improved method for use in the manufacture of such products and to an article for use in such method.

Heretofore, in the manufacture of ceramic articles such as glazed tile or the like, it has been the accepted practice in the industry to utilize loose sand between the layers of green tile in order to permit the articles to shrink during firing, and to support the articles away from the refractory bricks on which they are supported.

The use of loose sand has always presented a handling problem, has been generally difficult to distribute so as to obtain uniform separation and support of the articles to be fired, and has made it almost impossible to automate to any degree the handling of such articles during the preparatory stages leading up to kiln firing.

It is accordingly an object of the present invention to provide an improved method for separating ceramic articles during kiln firing.

It is a further object of the invention to provide a method which overcomes the difficulties set forth above.

Another objects of the invention is to provide a method for uniformly separating and supporting green ceramic articles prior to and during kiln firing.

Additional objects, if not specifically set forth herein, will be readily apparent to one skilled in the art from the following detailed description of the invention.

In the drawings:

FIGURE 1 ilustrates an end view of part of a stack of green tiles prepared for firing in accordance with the present invention.

Generally, the present invention comprises providing a uniform layer of high temperature resistant granules disposed in spaced relationship to one another on a thermally-destructible backing member and secured to such backing member by a thermally-destructible bonding agent for use as a separator in the firing of ceramic articles.

More specifically, the invention comprises disposing between ceramic surfaces to be separated or between such surfaces and supporting refractories a sheet or web of a material having a low ash content and bearing on at least one surface thereof a substantially uniform layer of granules which are of such a nature as to withstand high temperatures, e.g. 2000° F. or higher. These granules are held to the web or sheet in spaced relationship to one another by means of a bonding agent which when heated to high temperatures is completely destroyed leaving substantially no residue behind.

Figure 1:
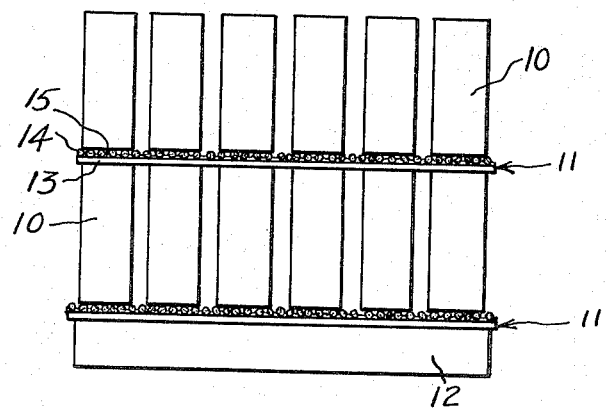

Referring to FIGURE 1 of the drawings, 10 represents the end of a green tile preparatory to firing in a kiln. These tiles are shown as stacked in two layers with a separator 11 according to the present invention between the layers and between the bottom tile 10 and the refractory support 12. The separator 11 consists of the backing member 13, granules 14 and bond 15.

Figure 2:
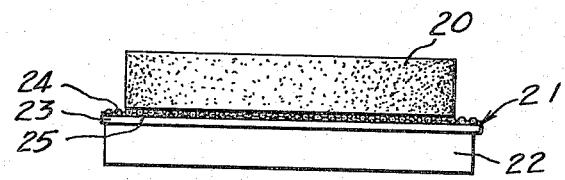
FIGURE 2 shows the present invention applied to the firing of a grinding wheel.

FIGURE 2 illustrates a green grinding wheel 20 supported by a separator 21 positioned on a refractory batt 22. The separator 21 consists of a thermally-destructible backing web 23 and a uniform layer of rounded heat resistant granules 24 spaced apart on the web 23 and held thereto by a thermally-destructible bonding agent 25.

Figure 3:
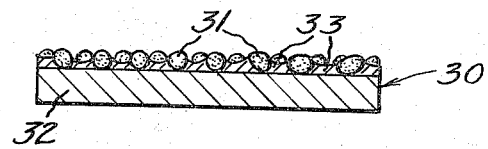
FIGURE 3 is a cross-sectional view of a separation material prepared in accordance with the present invention.

FIGURE 3 shows in greater detail a cross-section of a separator 30 having a layer of rounded heat-resistant granules 31 supported in spaced relationship on a heat-destructible backing member 32. The bond 33 is light weight and present only in sufficient amount to keep the granules 31 from falling off backing member 32 during handling prior to actual use.

The separator used in the method of the present invention must compete in cost with loose sand heretofore used although improved results are obtained by use thereof since any substantial increase in cost of processing would be uneconomical to the manufacturer of the ceramic articles. Accordingly, one criteria is the use of minimum amounts of materials in making up such separators. Generally the backings are paper although film or cloth could be used if desired. The backing must be substantially completely destroyed by the temperatures used in firing and the residue remaining must not affect the finished ceramic article in any way. Kraft paper has been found to be the preferred backing material and while the weight thereof is not critical, it is generally preferred that it be in the range of from 40 to 60 pound paper. The granules used must be capable of retaining their shape during the firing and again must not combine with nor affect the finished ceramic article. The preferred granules are rounded at their edges in contrast to the granules used in abrasive wheels or coated abrasives and the preferred material is a generally spherical flint granule. Materials of this type have been used for sand blasting and may be identified as flint shot or flint sand blast sand. Other particles or granules may obviously be used as a substitute for the flint shot if desired. The bond must be one which will not deleteriously affect the ceramic articles to be supported by the separator. The usual bonds applied to coated abrasive articles leave residues which discolor the ceramic articles or otherwise affect the finished prdouct. The best bond has been found to be dextrine. This material substantially completely disappears upon application of heat, yet serves as a sufficient bond to prevent shake-off of the granules prior to firing. Other bonding agents such as starch, glue, Vinsol and other natural resins or mixtures thereof may be used so long as care is taken that the residues therefrom do not adversely affect the particular ceramic material to be supported on the separators made using such bonding agents.

The dextrine bonding agent is prepared by mixing approximately 50% dextrine on a weight basis with water at a temperature of 130°–180° F. This mix is then agitated until the dextrine is dissolved. The viscosity of the resultant solution ranges between 4,000 and 10,000 cps. as measured with a #3 spindle at 20 r.p.m. using a LVF Brookfield Viscometer at 160° F.

The following examples are illustrative only of the formation of a separator material according to the present invention and are not to be construed as limitations on the scope of the appended claims:

*Example I*

A separator for use with ceramic tile was prepared by coating a 55# kraft paper backing with a dextrine maker coat of adhesive (described above) in an amount of 6.6#/ream. Flint shot (sand blast sand) having a particle size such that 90% of the shot passes through 20 to 40 mesh screens was then distributed uniformly on the adhesive coated sheet in an amount of 26.0#/ream. The finished separator was then air dried and rolled into Jumbo form. The product performed satisfactorily in the firing of green ceramic tile at a temperature of 2200° F.

*Example II*

Another separator was made up as in Example I utilizing as the backing a 30# kraft paper. The maker adhesive was the same as in Example I and was applied in the same amount. The granules used were conventional abrasive granules of flint, grit 60 and were applied in a weight of 20#/ream. Again, the finished separator proved satisfactory for use with ceramic tile fired at 2200° F. In this case as in Example I, the residue remaining of the backing and bond was negligible and did not in any way affect the tile itself. The granules remained intact—spaced substantially as they were before firing with respect to the tiles separated thereby.

Obviously, many variations and modifications may be made without departing from the spirit and scope of the invention disclosed herein and therefore only such limitations should be imposed as are contained in the appended claims.

I claim:

1. A method for the firing of ceramic articles which comprises:
    (a) providing at least one green ceramic article in condition to be fired;
    (b) providing a refractory support for said green ceramic article;
    (c) separating said green ceramic article at least from said refractory support by a plurality of spaced heat resistant granules bonded by a thermally-destructible adhesive bond to a thermally-destructible sheet backing member;
    (d) subjecting the combination in (c) to temperatures sufficiently high and for a period of time sufficiently long to cure the green ceramic article; and
    (e) destroying by said temperature said adhesive bond and said sheet backing member.

2. A method for the firing of ceramic articles which comprises:
    (a) providing at least two superposed layers of green ceramic articles in condition to be fired;
    (b) separating said layers by a plurality of spaced heat resistant granules bonded by a thermally-destructible adhesive bond to a thermally-destructible sheet backing member;
    (c) subjecting the combination in (b) to temperatures sufficiently high and for a period of time sufficiently long to cure the green ceramic article; and
    (d) destroying by said temperature said adhesive bond and said sheet backing member.

References Cited by the Examiner
UNITED STATES PATENTS

| | | | |
|---|---|---|---|
| 884,463 | 4/08 | Burgess | 264—59 |
| 1,917,964 | 7/33 | Fuschi | 264—58 |
| 2,360,479 | 10/44 | Detrick | 264 |
| 2,974,374 | 3/61 | Tate | 264—57 |

ROBERT F. WHITE, *Primary Examiner.*

ALEXANDER H. BRODMERKEL, *Examiner.*